(12) United States Patent
Whitehouse

(10) Patent No.: US 9,350,250 B2
(45) Date of Patent: May 24, 2016

(54) HIGH VOLTAGE DC/DC CONVERTER WITH CASCADED RESONANT TANKS

(75) Inventor: Robert S. Whitehouse, Stafford (GB)

(73) Assignee: Alstom Technology Ltd., Baden (CH)

( * ) Notice: Subject to any disclaimer, the term of this patent is extended or adjusted under 35 U.S.C. 154(b) by 162 days.

(21) Appl. No.: 14/124,704

(22) PCT Filed: Jun. 8, 2011

(86) PCT No.: PCT/EP2011/059514
§ 371 (c)(1),
(2), (4) Date: Dec. 6, 2013

(87) PCT Pub. No.: WO2012/167826
PCT Pub. Date: Dec. 13, 2012

(65) Prior Publication Data
US 2014/0098575 A1  Apr. 10, 2014

(51) Int. Cl.
*H02M 3/158* (2006.01)
*H02M 3/335* (2006.01)
*H02J 3/36* (2006.01)
(Continued)

(52) U.S. Cl.
CPC ............ *H02M 3/33507* (2013.01); *H02J 3/36* (2013.01); *H02M 3/07* (2013.01); *H02M 3/338* (2013.01); *H02M 7/103* (2013.01); *Y02B 70/1433* (2013.01); *Y02E 60/60* (2013.01)

(58) Field of Classification Search
CPC .......... Y02B 70/1416; Y02B 70/1441; Y02B 70/145; H02M 2007/4815; H02M 2007/4818; H02M 2007/4822; H02M 7/4826; H02M 3/158; H02M 7/48

USPC ................. 363/21.02, 21.03; 323/239, 242
See application file for complete search history.

(56) References Cited

U.S. PATENT DOCUMENTS 3,857,083 A   12/1974  Lundstrom
3,867,643 A   2/1975   Baker et al.
(Continued)

FOREIGN PATENT DOCUMENTS

CN   101 795 072 A    8/2010
DE   43 17 965 A1     12/1994
(Continued)

OTHER PUBLICATIONS

Office Action in U.S. Appl. No. 13/388,277, mailed on Mar. 18, 2015.
(Continued)

*Primary Examiner* — Gary L Laxton
(74) *Attorney, Agent, or Firm* — Nixon Peabody LLP; Khaled Shami

(57) ABSTRACT

A converter, for use in high voltage direct and alternating current power transmission comprises a primary charge transfer converter. The charge transfer converter includes first and second primary terminals for connection to one or more electrical networks. The primary charge transfer converter also includes a plurality of charge transfer elements and a plurality of primary switching elements which are connected in a cascade circuit between the first and second primary terminals. Each charge transfer element includes at least one resonant circuit. The primary switching elements are operable to selectively cause charging and discharging of each resonant circuit to transfer charge between the charge transfer elements and thereby create a voltage difference between the first and second primary terminals.

24 Claims, 12 Drawing Sheets

(51) Int. Cl.
*H02M 3/07* (2006.01)
*H02M 3/338* (2006.01)
*H02M 7/10* (2006.01)
*H02M 7/48* (2007.01)

(56) References Cited

U.S. PATENT DOCUMENTS

| | | |
|---|---|---|
| 4,053,820 A | 10/1977 | Peterson et al. |
| 4,300,181 A | 11/1981 | Premerlani |
| 4,636,907 A | 1/1987 | Howell |
| 4,658,227 A | 4/1987 | Howell et al. |
| 4,663,702 A | 5/1987 | Tanaka |
| 4,816,736 A | 3/1989 | Dougherty et al. |
| 5,027,264 A | 6/1991 | DeDoncker et al. |
| 5,093,583 A | 3/1992 | Mashino et al. |
| 5,164,872 A | 11/1992 | Howell |
| 5,339,210 A | 8/1994 | Howell |
| 5,345,375 A | 9/1994 | Mohan |
| 5,499,178 A | 3/1996 | Mohan |
| 5,515,264 A | 5/1996 | Stacey |
| 5,532,575 A | 7/1996 | Ainsworth et al. |
| 5,561,595 A * | 10/1996 | Smith ............................ 363/37 |
| 5,644,482 A | 7/1997 | Asplund |
| 5,673,189 A | 9/1997 | Schettler |
| 5,719,486 A | 2/1998 | Taniguchi et al. |
| 5,726,557 A | 3/1998 | Umeda et al. |
| 5,870,293 A | 2/1999 | Svensson et al. |
| 5,889,667 A | 3/1999 | Bernet |
| 5,892,677 A | 4/1999 | Chang |
| 5,936,855 A | 8/1999 | Salmon |
| 5,999,422 A | 12/1999 | Goransson et al. |
| 6,134,126 A | 10/2000 | Ikekame et al. |
| 6,137,704 A | 10/2000 | Ito et al. |
| 6,236,580 B1 | 5/2001 | Aiello et al. |
| 6,301,130 B1 | 10/2001 | Aiello et al. |
| 6,320,767 B1 | 11/2001 | Shimoura et al. |
| 6,392,348 B1 | 5/2002 | Dougherty |
| 6,603,675 B1 | 8/2003 | Norrga |
| 6,879,062 B2 | 4/2005 | Oates |
| 6,987,680 B2 | 1/2006 | Vire et al. |
| 7,050,311 B2 | 5/2006 | Lai et al. |
| 7,170,767 B2 | 1/2007 | Bixel |
| 7,199,535 B2 | 4/2007 | Welchko et al. |
| 7,274,576 B1 | 9/2007 | Zargari et al. |
| 7,292,462 B2 | 11/2007 | Watanabe et al. |
| 7,298,115 B2 | 11/2007 | Nishimura et al. |
| 7,499,291 B2 | 3/2009 | Han |
| 7,622,825 B2 | 11/2009 | Brune et al. |
| 7,729,144 B2 * | 6/2010 | Urakabe et al. ............... 363/71 |
| 8,188,720 B2 | 5/2012 | Kim et al. |
| 8,294,408 B2 | 10/2012 | Matt et al. |
| 8,390,259 B2 | 3/2013 | Dommaschk et al. |
| 8,861,234 B2 | 5/2013 | Trainer et al. |
| 8,599,591 B2 | 12/2013 | Crookes et al. |
| 8,854,843 B2 | 10/2014 | Trainer et al. |
| 8,861,231 B2 | 10/2014 | Cross et al. |
| 8,867,242 B2 | 10/2014 | Clare et al. |
| 8,867,244 B2 | 10/2014 | Trainer et al. |
| 8,891,209 B2 | 11/2014 | Hafner et al. |
| 8,934,268 B2 | 1/2015 | Trainer et al. |
| 9,065,299 B2 | 6/2015 | Trainer et al. |
| 9,130,458 B2 | 9/2015 | Crookes et al. |
| 2002/0060497 A1 | 5/2002 | Arita et al. |
| 2002/0149953 A1 | 10/2002 | Smedley et al. |
| 2002/0176265 A1 | 11/2002 | Oates |
| 2003/0202367 A1 | 10/2003 | Schreiber |
| 2004/0218318 A1 | 11/2004 | Bijlenga et al. |
| 2005/0127853 A1 | 6/2005 | Su |
| 2005/0135126 A1 | 6/2005 | Gazel et al. |
| 2005/0146226 A1 | 7/2005 | Trainer et al. |
| 2008/0002443 A1 | 1/2008 | Ueda et al. |
| 2008/0007978 A1 | 1/2008 | Han |
| 2008/0137383 A1 | 6/2008 | Chang et al. |
| 2008/0179951 A1 | 7/2008 | Brune et al. |
| 2008/0205093 A1 | 8/2008 | Davies et al. |
| 2008/0258661 A1 | 10/2008 | Nagashima et al. |
| 2008/0310205 A1 | 12/2008 | Hiller |
| 2009/0021966 A1 * | 1/2009 | Jacobson et al. ............... 363/52 |
| 2009/0027934 A1 | 1/2009 | Bustos |
| 2009/0033254 A1 | 2/2009 | Nagashima et al. |
| 2009/0085548 A1 | 4/2009 | Suh et al. |
| 2009/0102436 A1 | 4/2009 | Valderrama et al. |
| 2009/0206781 A1 | 8/2009 | Itoh et al. |
| 2010/0067266 A1 | 3/2010 | Dommaschk et al. |
| 2010/0118578 A1 | 5/2010 | Dommaschk et al. |
| 2010/0309698 A1 | 12/2010 | Asplund et al. |
| 2011/0018481 A1 | 1/2011 | Hiller |
| 2011/0044077 A1 * | 2/2011 | Nielsen ........................... 363/37 |
| 2011/0149622 A1 | 6/2011 | Lin |
| 2011/0205768 A1 | 8/2011 | Svensson |
| 2011/0260701 A1 | 10/2011 | Horger et al. |
| 2012/0026767 A1 | 2/2012 | Inoue et al. |
| 2012/0063185 A1 | 3/2012 | Janning |
| 2012/0069610 A1 | 3/2012 | Trainer et al. |
| 2012/0120697 A1 | 5/2012 | Cuk |
| 2012/0127766 A1 | 5/2012 | Crookes et al. |
| 2012/0170338 A1 | 7/2012 | Trainer et al. |
| 2012/0182771 A1 | 7/2012 | Trainer et al. |
| 2012/0188803 A1 | 7/2012 | Trainer et al. |
| 2012/0195084 A1 | 8/2012 | Norrga |
| 2012/0234796 A1 | 9/2012 | Juhlin |
| 2013/0020881 A1 | 1/2013 | Panousis et al. |
| 2013/0026841 A1 | 1/2013 | Hosini et al. |
| 2013/0051105 A1 | 2/2013 | Wang et al. |
| 2013/0094264 A1 | 4/2013 | Crookes et al. |
| 2013/0099572 A1 | 4/2013 | Norrga |
| 2013/0119970 A1 | 5/2013 | Trainer et al. |
| 2013/0128629 A1 | 5/2013 | Clare et al. |
| 2013/0128636 A1 | 5/2013 | Trainer et al. |
| 2013/0182467 A1 | 7/2013 | Cross et al. |
| 2013/0194838 A1 | 8/2013 | Jang et al. |
| 2013/0208514 A1 | 8/2013 | Trainer et al. |
| 2013/0208521 A1 | 8/2013 | Trainer et al. |
| 2013/0279211 A1 | 10/2013 | Green et al. |
| 2014/0133196 A1 | 5/2014 | Trainer |
| 2014/0146583 A1 | 5/2014 | Trainer et al. |
| 2014/0254205 A1 | 9/2014 | Trainer et al. |
| 2014/0293656 A1 | 10/2014 | Trainer et al. |
| 2014/0293668 A1 | 10/2014 | Trainer et al. |
| 2014/0313797 A1 | 10/2014 | Davidson et al. |
| 2015/0009594 A1 | 1/2015 | Okaeme et al. |
| 2015/0116881 A1 | 4/2015 | Burnett et al. |
| 2015/0131189 A1 | 5/2015 | Davidson et al. |

FOREIGN PATENT DOCUMENTS

| | | |
|---|---|---|
| DE | 195 35 552 | 4/1996 |
| DE | 101 03 031 | 7/2002 |
| DE | 10 2005 040 432 A1 | 3/2007 |
| DE | 10 2007 003 172 A1 | 2/2008 |
| DE | 10 2008 045 247 A1 | 3/2008 |
| DE | 10 2008 014 898 A1 | 9/2009 |
| DE | 10 2010 007 452 A1 | 8/2011 |
| EP | 0 867 998 B1 | 3/2007 |
| EP | 1 800 391 | 6/2007 |
| GB | 2 294 821 | 5/1996 |
| GB | 2 375 902 A | 11/2002 |
| GB | 2 418 079 | 3/2006 |
| JP | 2008-125310 A | 5/2008 |
| WO | 97/02639 | 1/1997 |
| WO | 02/50972 A1 | 6/2002 |
| WO | 02/063758 | 8/2002 |
| WO | 03/055048 | 7/2003 |
| WO | 2007/023061 A2 | 3/2007 |
| WO | 2007/028349 | 3/2007 |
| WO | 2007/028350 | 3/2007 |
| WO | 2007/033852 A1 | 3/2007 |
| WO | 2008/024038 A1 | 2/2008 |
| WO | 2008/086760 | 7/2008 |
| WO | 2009/149743 | 12/2009 |
| WO | 2010/025758 | 3/2010 |
| WO | 2010/040388 A1 | 4/2010 |
| WO | 2010/069371 | 6/2010 |
| WO | 2010/088969 | 8/2010 |

(56) References Cited

FOREIGN PATENT DOCUMENTS

| WO | 2010/112523 A1 | 10/2010 |
|---|---|---|
| WO | 2010/145688 | 12/2010 |
| WO | 2010/145689 | 12/2010 |
| WO | 2010/145690 | 12/2010 |
| WO | 2010/149200 | 12/2010 |
| WO | 2011/012171 | 2/2011 |
| WO | 2011/012174 | 2/2011 |
| WO | 2011/015227 A1 | 2/2011 |
| WO | 2011/029480 A1 | 3/2011 |
| WO | 2011/044928 A1 | 4/2011 |
| WO | 2011/050832 A1 | 5/2011 |
| WO | 2011/050847 | 5/2011 |
| WO | 2011/098117 | 8/2011 |
| WO | 2011/113471 | 9/2011 |
| WO | 2011116816 A1 | 9/2011 |
| WO | 2011/124258 | 10/2011 |
| WO | 2011/127980 | 10/2011 |
| WO | 2011/141054 A1 | 11/2011 |
| WO | 2011/157300 | 12/2011 |
| WO | 2012007040 A1 | 1/2012 |
| WO | 2012/013248 | 2/2012 |
| WO | 2012/025142 | 3/2012 |
| WO | 2012/167826 A1 | 12/2012 |
| WO | 2013/000510 | 1/2013 |
| WO | 2013/071975 A1 | 5/2013 |
| WO | 2013/017160 A1 | 7/2013 |
| WO | 2013/017177 A1 | 7/2013 |
| WO | 2013/127461 A1 | 9/2013 |
| WO | 2013/127462 A1 | 9/2013 |
| WO | 2013/127463 A1 | 9/2013 |

OTHER PUBLICATIONS

Notice of Allowance in U.S. Appl. No. 13/634,205, mailed on Apr. 27, 2015.
Office Action in U.S. Appl. No. 14/129,923, mailed on Feb. 17, 2015.
Office Action in U.S. Appl. No. 14/359,088, mailed on Apr. 7, 2015.
Lesnicar, A. et al., "A New Modular Voltage Source Inverter Topology", European Power Electronics Conference (EPE), Toulouse, France, Sep. 2-4, 2003, 10 pages.
Lesnicar, A. et al., "An Innovative Modular Multilevel Converter Topology Suitable for a Wide Power Range", Power Tech Conference Proceedings, Bologna, Italy, Jun. 23-26, 2003, Bologna, IEEE, vol. 3, 2003, 6 pages.
Qahraman, B. et al., "A VSC Based Series Hybrid Converter for HVDC Transmission", Canadian Conference Electrical and Computer Engineering Conference, 2005, CCECE/CCGEI, Saskatoon, May 1-4, 2005, pp. 458-461.
Raju, N. R., "A DC Link-Modulated Three-Phase Converter", Industry Applications Conference, 2001. Thirty-Sixth Ias Annual Meeting, Chicago, IL, Sep. 30, 2001-Oct. 4, 2001. Conference Record of the 2001 IEEE, vol. 4, pp. 2181-2185.
Su, Gui-Jia et al., "Multilevel DC Link Inverter for Brushless Permanent Magnet Motors with Very Low Inductance", Industry Applications Conference, 2001. Thirty-Sixth IAS Annual Meeting, Chicago, IL, Sep. 30, 2001-Oct. 4, 2001. Conference Record of the 2001 IEEE, vol. 2, pp. 829-834.
PCT International Search Report and Written Opinion in International Application No. PCT/EP10/62316, mailed on Jul. 6, 2011.
PCT International Search Report in International Application No. PCT/EP2011/070402, mailed on Sep. 27, 2012.
PCT International Preliminary Report on Patentability in International Application No. PCT/EP2011/070402, mailed on Feb. 18, 2014.
First Chinese Office Action in Application No. 2009801607004, mailed Jun. 25, 2014.
Notice of Allowance in U.S. Appl. No. 13/378,336, mailed on Jun. 13, 2014.
Office Action in U.S. Appl. No. 13/388,277, mailed on Jul. 3, 2014.
Notice of Allowance in U.S. Appl. No. 13/576,920, mailed on Jun. 9, 2014.
Office Action in U.S. Appl. No. 13/639,844, mailed on May 22, 2014.
Notice of Allowance in U.S. Appl. No. 13/640,468, mailed on Jun. 4, 2014.
Notice of Allowance in U.S. Appl. No. 13/813,414, mailed on Jun. 2, 2014.
Notice of Allowance in U.S. Appl. No. 13/818,654, mailed on May 30, 2014.
U.S. Appl. No. 14/357,908, filed May 13, 2014.
PCT International Search Report and Written Opinion in International Application No. PCT/EP20101053290, mailed on Feb. 11, 2011.
PCT International Preliminary Report on Patentability in International Application No. PCT/EP2010/053290, mailed on Apr. 20, 2012.
Notice of Allowance in U.S. Appl. No. 13/576,920, mailed on Mar. 20, 2014.
Davidson, C.C et al., "Innovative Concepts For Hybrid Multi-Level Converters For HVDC Power Transmission", 9th IET International Conference on AC and DC Power Transmission, ACDC 2010, Oct. 19-21, 2010, 5 pages.
Ertl, H et al., "A Constant Output Current Three-Phase Diode Bridge Rectifier Employing a Novel Electronic Smoothing Inductor", IEEE Transactions on Industrial Electronics, vol. 52, Issue 2, Apr. 1, 2005, pp. 454-461.
Flourentzou, Nikolas et al., "VSC-Based HVDC Power Transmission Systems: An Overview", IEEE Transactions on Power Electronics, vol. 24, No. 3, Mar. 2009, pp. 592-602.
Merlin, M.M.C. et al. "A New Hybrid Multi-Level Voltage-Source Converter With DC Fault Blocking Capability", 9th IET International Conference on AC and DC Power Transmission, ACDC 2010, Oct. 19-21, 2010, 5 pages.
Watkins, S.J. et al., "Multilevel Asymmetric Power Converters for Switched Reluctance Machines", International Conference on Power Electronics, Machines and Drives, Apr. 16-18, 2002, IEEE 2002, Conf. Publ. No. 487, pp. 195-200.
PCT International Preliminary Report on Patentability in International Application No. PCT/EP10/62316, mailed on Mar. 7, 2013.
PCT International Search Report and Written Opinion in International Application No. PCT/EP2011/063207, mailed May 30, 2012.
PCT International Preliminary Report on Patentability in International Application No. PCT/EP2011/063207, mailed on Apr. 2, 2014.
PCT International Search Report and Written Opinion in International Application No. PCT/EP20111064545, mailed Jun. 11, 2012.
PCT International Preliminary Report on Patentability in International Application No. PCT/EP2011/064545, mailed May 19, 2014.
PCT International Search Report and Wirtten Opinion in International Application No. PCT/EP2012/053571, mailed on Jun. 20, 2012.
PCT International Preliminary Report on Patentability in International Application No. PCT/EP2012/053571, mailed on Sep. 12, 2014.
PCT International Search Report and Written Opinion in International Application No. PCT/EP20121053574, mailed on Nov. 20, 2012.
PCT International Preliminary Report on Patentability in International Application No. PCT/EP2012/053574, mailed on Jul. 21, 2014.
PCT International Search Report and Written Opinion in International Application No. PCT/EP20121053573, mailed on Dec. 4, 2012.
PCT International Preliminary Report on Patentability in International Application No. PCT/EP2012/053573, mailed on Jul. 21, 2014.
Office Action in U.S. Appl. No. 13/634,205, mailed on Sep. 22, 2014.
Notice of Allowance in U.S. Appl. No. 13/639,844, mailed on Sep. 8, 2014.
Notice of Allowance in U.S. Appl. No. 13/805,333, mailed on Feb. 2, 2015.
U.S. Appl. No. 14/379,746, filed Aug. 28, 2014.
U.S. Appl. No. 14/381,570, filed Aug. 27, 2014.
Allebrod, S. et al., "New Transformerless, Scalable Modular Multilevel Converters for HVDC—Transmission", Power Electronics Specialists Conference, IEEE, Jun. 15, 2008, pp. 174-179.

(56) References Cited

OTHER PUBLICATIONS

Baran M. E. et al., "Overcurrent Protection in DC Zonal Shipboard Power Systems uisng Solid State Protection Devices", Electric Ship Technologies Symposium, 2007. ESTS '07. IEEE, IEEE, PL, May 1, 2007, pp. 221-224.
Glinka M., "Prototype of Multiphase Modular-Multilevel-Converter with 2MW Power Rating and 17-Level-Output Voltage", 2004 35th Annual IEEE Power Electronics Specialists Conference, Jun. 20-25, 2004, pp. 2572-2576.
Guanjun Ding et al., "New Technologies of Voltage Source Converter (VSC) for HVDC Transmission System Based on VSC", Power and Energy Society General Meeting—Conversion and Delivery of Electrical Energy in the 21st Century, 2008 IEEE, IEEE, Piscataway, NJ, USA, Jul. 20, 2008, p. 1-8.
Hagiwara, Makoto et al., "PWM Control and Experiment of Modular Multilevel Converters", Power Electronics Specialists Conference, PESC 2008, IEEE, Piscataway, NJ, USA, pp. 154-161, (2008).
Hongbo, Jiang, et al., "Harmonic Cancellation of a Hybrid Converter", High Power Electronics, The Royal Institute of Technology, Stockholm Sweden, IEEE Transaction on Power Delivery, vol. 13, No. 4, Oct. 1998, pp. 1291-1296.
Knudsen, L. et al., "Description and Prospective Applications of New Multi-Terminal HVDC System Concepts", CIGRE Conf. Internationale Des Grands Reseaux Electriques, Aug. 26-Sep. 1, 1990, pp. 1-11.
Lesnicar, A. et al., "A New Modular Voltage Source Inverter Topology", pp. 1-10, (2003), XP002454302.
Lesnicar, A. et al., "An Innovative Modular Multilevel Converter Topology Suitable for a Wide Power Range", 2003 IEEE Bologna PowerTech Conference, Jun. 23-26, 2003, pp. 1-6.
Liu, Y.H. et al., "A New STATCOM Configuration Using Multi-Level DC Voltage Reinjection for High Power Application", IEEE Transactions on Power Delivery, vol. 19, No. 4, Oct. 2004, New Zealand, pp. 1828-1834.
Liu, Y.H. et al., "A New High-Pulse Voltage-Sourced Converter for HVDC Transmission", IEEE Transactions on Power Delivery, vol. 18, No. 4, Oct. 2003, New Zealand, pp. 1388-1393.
Qahraman, B. et al., "A VSC Based Series Hybrid Converter for HVDC Transmission", IIEE 0/7803-8886-0/05 CCECE/CCGEI, Saskatoon, May 2005, pp. 458-461.
Raju, N. Ravisekhar, "A DC Link-Modulated Three-Phase Converter", Silicon Power Corp., IEEE, 0/7803-7116-X/01, 2001, pp. 2181-2185.
Su, Gui-Jia et al., "Multilevel Dc Link Inverter for Brushless Permanent Magnet Motors with Very Low Inductance", Prepared by Oak Ridge National Laboratory for U.S. Dept. of Energy, 2001, IEEE 0-7803-7116-X/01, pp. 829-834.
Wong, C. et al., "Feasibility Study of AC and DC-Side Active Filters for HDVC Converter Terminals", IEEE Transactions on Power Delivery, vol. 4, No. 4, Oct. 1989, New York, NY, USA, pp. 2067-2075.
Zhang, W. et al., "Active DC Filter for HVDC Systems", IEEE Computer Applications in Power, vol. 7, No. 1, Jan. 1994, New Yok, USA, pp. 40-44.
PCT International Search Report and Written Opinion for Application No. PCT/EP2009/057388, mailed on Mar. 18, 2010.
PCT International Preliminary Report on Patentability in International Application No. PCT/EP2009/057388, mailed on Dec. 14, 2011.
PCT International Search Report and Written Opinion in International Application No. PCT/EP20091057736, mailed on Mar. 26, 2010.
PCT International Preliminary Report on Patentability in International Application No. PCT/EP2009/057736, mailed on Nov. 24, 2011.
PCT International Search Report and Written Opinion in International Application No. PCT/EP20091059973, mailed on Aug. 13, 2010.
PCT International Preliminary Report on Patentability in International Application No. PCT/EP2009/059973, mailed on Oct. 5, 2011.
PCT International Search Report and Written Opinion in International Application No. PCT/EP20101051572, mailed on Jan. 19, 2011.
PCT International Preliminary Report on Patentability in International Application No. PCT/EP2010/051572, mailed on Apr. 20, 2012.
PCT International Search Report and Written Opinion in International Application No. PCT/EP20101054660, mailed on Feb. 24, 2011.
PCT International Preliminary Report on Patentability in International Application No. PCT/EP2010/054660, mailed on Jun. 6, 2012.
PCT International Search Report for International Application No. PCT/EP2010/054974, mailed on Mar. 4, 2011.
PCT International Preliminary Report on Patentability in International Application No. PCT1EP2010/054974, mailed on Aug. 10, 2012.
PCT International Search Report and Written Opinion in International Application No. PCT/EP20101058630, mailed on Apr. 19, 2011.
PCT International Preliminary Report on Patentability in International Application No. PCT/EP2010/058630, mailed on Dec. 19, 2012.
PCT International Search Report and Written Opinion for Application No. PCT/EP2010/061145, mailed on Jun. 5, 2011.
PCT International Preliminary Report on Patentability in International Application No. PCT/EP2010/061145, mailed on Aug. 20, 2012.
PCT International Search Report and Written Opinion in International Application No. PCT/EP20111059514, mailed on Jul. 5, 2012.
PCT International Preliminary Report on Patentability in International Application No. PCT/EP2011/059514, mailed on Aug. 1, 2013.
PCT International Search Report and Written Opinion in International Application No. PCT/EP20111060907, mailed on Jul. 16, 2012.
PCT International Preliminary Report on Patentability in International Application No. PCT/EP2011/060907, mailed on Sep. 24, 2013.
Office Action in U.S. Appl. No. 13/388,277, mailed on Nov. 22, 2013.
Notice of Allowance in U.S. Appl. No. 13/378,336, mailed on Feb. 6, 2014.
Notice of Allowance in U.S. Appl. No. 13/380,500, mailed on Jun. 11, 2013.
Notice of Allowance in U.S. Appl. No. 13/380,500, mailed on Jul. 31, 2013.
Notice of Allowance in U.S. Appl. No. 13/576,920, mailed on Dec. 4, 2013.
U.S. Appl. No. 14/129,923.
Office Action for U.S. Appl. No. 14/236,627, mailed Aug. 4, 2015.
Office Action, dated Jul. 31, 2015, issued in U.S. Appl. No. 14/236,628.
Office Action, dated Aug. 4, 2015, issued in U.S. Appl. No. 14/236,627.
Final Office Action, dated Sep. 18, 2015, issued in U.S. Appl. No. 14/129,923.
Office Action, dated Oct. 7, 2015, issued in U.S. Appl. No. 13/388,277.
Final Office Action, dated Dec. 7, 2015, issued in U.S. Appl. No. 14/236,627.
Final Office Action, dated Dec. 17, 2015, issued in U.S. Appl. No. 14/236,628.
Examiner-Initiated Interview Summary, dated Jan. 5, 2016, issued in U.S. Appl. No. 14/359,088, 3 pages.
Office Action, dated Mar. 16, 2016, issued in U.S Appl. No. 14/381,570, 32 pages.
Office Action, dated Mar. 23, 2016, issued in U.S Appl. No. 14/379,746, 31 pages.

* cited by examiner

HIGH VOLTAGE DC/DC CONVERTER WITH CASCADED RESONANT TANKS

CROSS REFERENCE TO RELATED APPLICATIONS

This application is the national stage of International Application No. PCT/EP2011/059514, filed Jun. 8, 2011, entitled, "HIGH VOLTAGE DC/DC CONVERTER WITH CASCADED RESONANT TANKS," the contents of which are incorporated herein by reference in its entirety.

TECHNICAL FIELD

This invention relates to a converter for use in high voltage direct current (DC) and alternating current power transmission.

BACKGROUND

Power transmission networks typically include interconnected electrical networks operating at different voltages. The variation in these operating voltages arises as a result of many factors including the size and locality of the individual electrical network, the local power requirements and so on.

In high voltage direct current (HVDC) power transmission networks, alternating current power is generated by the generator plant at a low voltage level in the range of a few kV before being stepped up in a collector station to a higher voltage level in the range of a few hundred kV and then converted to direct current power for transmission via overhead lines and/or undersea cables. This conversion removes the need to compensate for the AC capacitive load effects imposed by the transmission line or cable, and thereby reduces the cost per kilometer of the lines and/or cables. Conversion from AC to DC thus becomes cost-effective when power needs to be transmitted over a long distance.

DC transmission and distribution networks are needed to support the emergence of HVDC power transmission. However, interconnecting the DC transmission and distribution networks to form a DC power grid is difficult because different DC networks may operate at different voltage levels depending on various factors as outlined above.

In order to interconnect power networks operating at different voltage levels, it is necessary to employ devices that are capable of performing a voltage step-up/step-down operation.

An example of such a device is a transformer. Transformers conventionally used in distribution, industrial and power applications typically include primary and secondary windings which are linked to separate power networks. Electrical power is transferred from the primary winding to the secondary winding by varying the current in the primary winding, and thereby creating a varying magnetic flux in the transformer. This change in magnetic flux leads to an induction of voltage in the secondary winding and thereby a transfer of electrical power between the separate power networks. As such, transformers are suitable for interconnecting separate AC networks. Transformers can also be employed in DC to DC voltage conversion, which involves conversion of a DC voltage to an AC voltage to enable the use of a transformer and converting the stepped-up/stepped-down AC voltage back to DC voltage.

Transformers used in high voltage applications however tend to be bulky and heavy. This not only adds to the overall size and weight of the power converter and power station, but also leads to increased costs associated with transport of the transformers to the site of the power station.

Other examples of devices that are capable of performing a voltage step-up/step-down operation are buck converters and boost converters. These DC to DC converters are forms of switched mode power supplies that rely on the use of switches and passive elements to control the transfer of power between DC networks. The voltage step-up/step-down capability of these DC to DC converters can be regulated to a desired level by controlling the duty cycle of the switches. In general, the structure of each of the buck and boost converters leads to inefficient transfer of power between the DC networks.

In addition, the flow of current in the buck and boost converters is such that their switches are required to be rated so as to be compatible with both high voltage, low current and low voltage, high current DC networks.

Similarly, AC to DC and DC to DC voltage conversion schemes, which employ the use of transformers, also require switches which are capable of supporting the entire power load during voltage conversion.

Consequently the switches must be designed to have both high voltage and high current ratings, which leads to an increase in hardware size, weight and cost.

Overview

According to a first aspect of the invention, there is provided a converter for use in high voltage direct and alternating current power transmission, the converter comprising a primary charge transfer converter, including first and second primary terminals for connection to one or more electrical networks, a plurality of charge transfer elements and a plurality of primary switching elements connected in a cascade circuit between the first and second primary terminals, each charge transfer element including at least one resonant circuit, the primary switching elements being operable to selectively cause charging and discharging of each resonant circuit to transfer charge between the charge transfer elements and thereby create a voltage difference between the first and second primary terminals The provision of resonant circuits in the charge transfer converter allows power to be transferred between the first and second primary terminals of the charge transfer. Such transfer takes place by commutation of the primary switching elements which can occur at near zero current so as to minimise switching losses. The converter of the invention is therefore very efficient.

Additionally, during operation of the converter, a significant portion of the overall current flowing in the converter flows directly between the charge transfer elements rather than via the primary switching elements. Consequently each primary switching element only carries a small portion of the overall current flowing within the converter, which means that it is possible to use primary switching elements with lower power ratings. This leads to a decrease in hardware costs and in the physical size of the converter.

The use of a cascade circuit in the converter permits the interconnection of electrical networks having different voltage levels and thereby removes the need for large and bulky transformers to step up or step down the operating voltage. This in turn leads to a reduction in converter size, weight and cost, which is beneficial for locations having restrictions on converter size and weight such as, for example, offshore power stations.

The modular nature of the cascade circuit means that it is relatively straightforward to increase or decrease the number of charge transfer elements and primary switching elements. As such, the converter to the invention can be easily modified to suit the requirements of the associated power application, such as station footprint size or required voltage operating range.

Preferably, the junction between adjacent primary switching elements defines a secondary terminal.

The provision of one or more secondary terminals permits the converter to be simultaneously connected to multiple power networks having different voltage levels and also provides flexibility of being connectable to a wide range of voltages without having to modify the design and structure of the converter.

Optionally, the or at least one resonant circuit of each charge transfer element includes at least one inductor connected in series with at least one capacitor.

At least one charge transfer element may include a plurality of parallel-connected resonant circuits.

Such features allow the structure of each charge transfer element to be varied depending on the power ratings of available components and the voltage and current requirements of the associated power application.

Each primary switching element preferably is or includes a semiconductor device.

Each primary switching element may also include an antiparallel diode connected in parallel with the semiconductor device.

The selection such of primary switching elements allows the converter to be configured to transfer power from the first primary terminal to the second primary terminal or vice versa.

The or each semiconductor device may be an insulated gate bipolar transistor, a gate turn-off thyristor, a field effect transistor, a transistor, an injection enhancement gate transistor, an insulated gate commutated thyristor or an integrated gate commutated thyristor.

The use of semiconductor devices is advantageous because such devices are small in size and weight and have relatively low power dissipation, which minimises the need for cooling equipment. Their inclusion, therefore, leads to significant reductions in power converter cost, size and weight.

Conveniently the plurality of primary switching elements define a cascade arrangement of alternating odd and even primary switching elements, the primary switching elements being controllable to selectively put each of the odd primary switching elements in a first open/closed state and each of the even primary switching elements in a second open/closed state opposite the first open/closed state.

The plurality of primary switching elements are controllable to alternate between a closed state and an open state.

The operation of the primary switching elements in the foregoing manner ensures that the majority of the charging and discharging current flows directly between charge transfer elements instead flowing through each primary switching element. This reduces the current load through each primary switching element during normal operation of the converter, and so reduces the corresponding current rating required for the switching element.

Preferably each of the primary switching elements is controllable in use to delay switching between the open state and the closed state.

Each of the primary switching elements is also preferably controllable to vary the length of the delay in switching between open and closed sates.

The delay in switching helps to ensure that there is no direct connection between the voltages connected to the first and second primary terminals at any time and thereby prevents short-circuiting of the charge transfer elements. There is, therefore, a reduced risk of a higher than normal current load passing through each primary switching element.

Preferably the resonant circuit of each charge transfer element is tuned to the same resonant frequency.

Optionally the switching frequency of each primary switching element is approximately equal to the resonant frequency of the resonant circuits.

This leads to the formation of a sinusoidal current in the primary charge transfer converter, which enables soft switching of each primary at or near zero current, switching element and thereby reduces switching losses in the primary switching elements.

The converter may further include least one DC link capacitor connected in parallel with the primary charge transfer converter.

The inclusion of a DC link capacitor improves the efficiency of the voltage conversion process by minimising harmonic distortion in a DC voltage from the first DC network.

In a preferred embodiment of the invention the converter further includes a primary auxiliary unit connected to the second primary terminal thereof, the primary auxiliary unit defining either a charge store or a charge generator including an auxiliary terminal for connection to an electrical network.

The provision of a primary auxiliary unit allows the converter to provide a voltage step-down or step-up without the need for a bulky and expensive transformer.

Conveniently the primary auxiliary unit defines a charge store including at least one reservoir capacitor to store said charge.

Such a feature allows the converter to provide a voltage step-down.

Optionally the primary auxiliary unit defines a charge generator including an oscillator circuit to introduce an AC voltage component into the charge transfer elements of the primary charge transfer converter. This allows the converter to provide a voltage step-up.

In another preferred embodiment of the invention the oscillator circuit operates at a frequency that approximates the resonant frequency of the charge transfer elements.

Such an arrangement allows switching of the primary switching elements at or near zero voltage, and so minimises losses in the converter.

According to a second aspect of the invention there is provided a converter assembly comprising a converter as described hereinabove, the first primary terminal of the primary charge transfer converter being connected in use to a positive terminal of a first DC network, the auxiliary terminal of the auxiliary unit being in use to a negative terminal of the first DC network, and the junction between respective adjacent primary switching elements being connected in use to respective positive, negative and ground terminals of a second DC network.

According to a third aspect of the invention there is provided a converter assembly comprising a first converter as described hereinabove, a plurality of parallel-connected secondary charge transfer converters each having a respective secondary auxiliary unit connected to the second primary terminal, the first primary terminal of each parallel-connected secondary charge transfer converter being connected to the auxiliary terminal of the first converter.

The converter assembly may further include a transformer connected to the auxiliary terminal of each secondary auxiliary units and a respective phase of a multiphase AC network.

Optionally the converter assembly includes a second converter as described (hereinabove), the auxiliary terminal of the second converter being connected to the auxiliary terminal of each secondary auxiliary unit the first primary terminal of each converter being connected in use to respective positive and negative terminals of a first DC network, and each secondary charge transfer converter including a secondary terminal for connection in use to a respective phase of a multiphase AC network.

According to a fourth aspect of the invention there is provided a converter assembly comprising a plurality of converters as described hereinabove, the converter assembly including at least one converter limb having first and second limb portions, each limb portion including a said converter, the auxiliary terminal of the auxiliary unit in the converter in the first limb portion being connected in series with the auxiliary terminal of the auxiliary unit in the converter in the second limb portion to connect the converters in a given convert limb with one another end to end the first primary terminal of the converter in the first limb portion being connected in use to a positive terminal of a first DC network, the first primary terminal of the converter in the second limb portion being connected in use to a negative terminal of the first DC network, and the series connection between the auxiliary terminals defining a phase terminal connected in use to an AC network, the auxiliary unit of each limb portion being operable to switch the respective limb portion in and out of circuit so as to generate a voltage waveform at the phase terminal of the respective converter limb.

Such a converter assembly preferably includes a plurality of converter limbs, each converter limb defining a phase terminal for connection to a respective phase of a multiphase AC network.

Each converter limb operates independently of the other converter limbs and therefore only directly affects the phase connected to the respective phase terminal. As a result a given converter limb causes minimal disruption to the phases connected to the phase terminals of the other converter limbs.

As set out above the converter of the invention can be easily incorporated into various converter assemblies to specific requirements of the associated power application.

Preferably each auxiliary unit includes reference terminal which is connected in use to a lower voltage potential than the corresponding auxiliary terminal.

BRIEF DESCRIPTION OF THE DRAWINGS

Preferred embodiments of the invention will now be described, by way of non-limiting examples, with reference to the accompanying drawings in which.

DESCRIPTION OF EXAMPLE EMBODIMENTS

Figure 1:
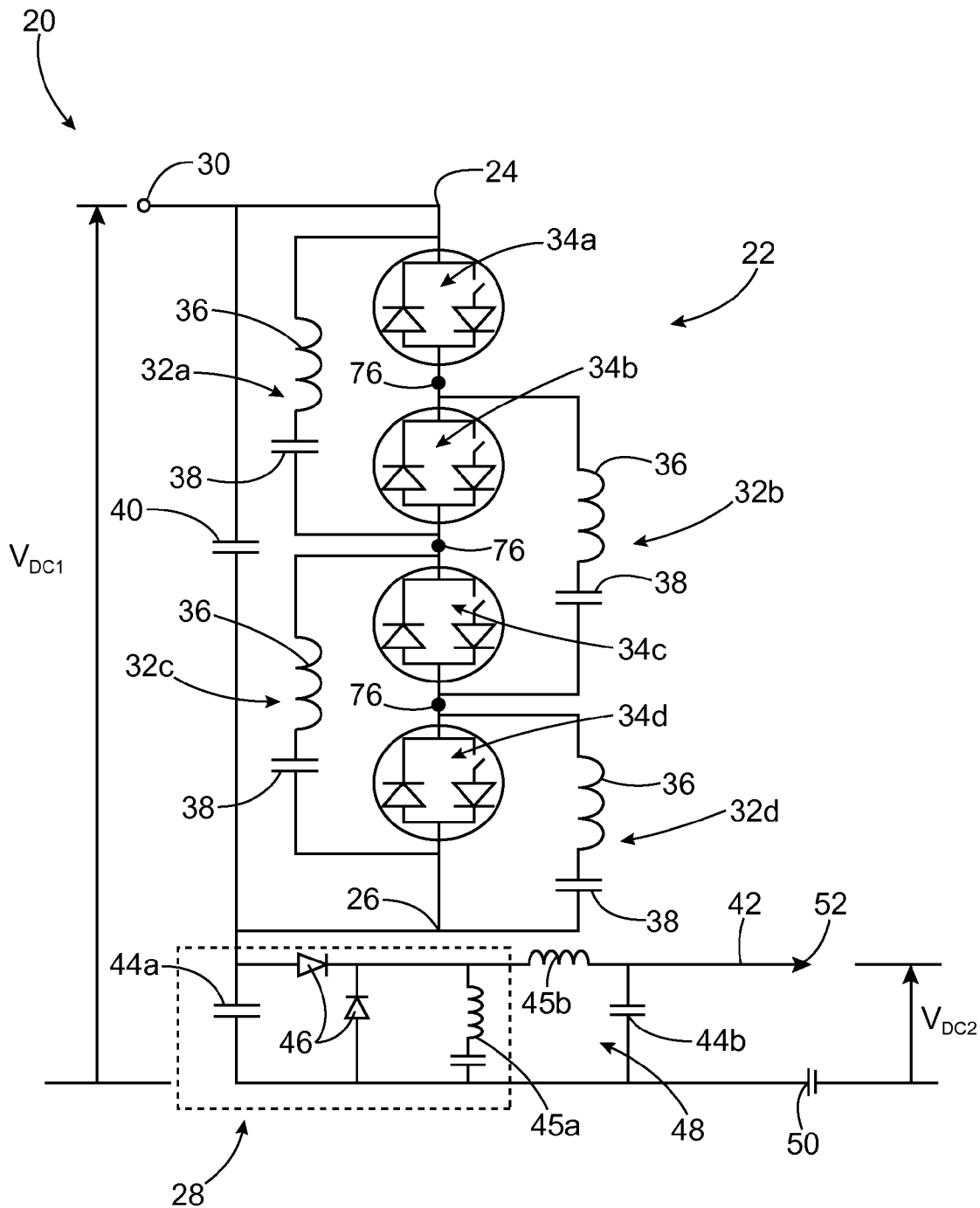
FIG. 1 shows a converter according to a first embodiment of the invention.

A converter 20 according to a first embodiment of the invention is shown in FIG. 1. The converter 20 could be considered a Resonant Charge Transfer Converter because of the manner in which functions, as set out below. For the sake of conciseness, however, it will be referred to as a converter throughout this specification.

The converter 20 comprises a primary charge transfer converter 22 having a first primary terminal 24 and a second primary terminal 26. The converter 20 also includes an auxiliary unit 28 which is connected to the second primary terminal 26 of the primary charge transfer converter 22.

The first primary terminal may be connected in use to a first DC network 30 which carries a first DC voltage, $V_{DC1}$. The first primary terminal 24 may be connected to the first DC network 30 via one or more inductors (not shown).

The primary charge transfer converter 22 includes first, second, third and fourth charge transfer elements 32a,32b, 32c,32d which are connected with first, second, third and fourth primary switching elements 34a,34b,34c,34d in cascade circuit between the first and second primary terminals 24,26. The cascade circuit resembles a Cockcroft-Walton cascade circuit.

Other embodiments of the invention (not shown) may include more or less charge transfer elements and primary switching elements arranged in a similar manner.

Each primary switching element 34a,34b,34c,34d includes an insulated gate bipolar transistor (IGBT) connected in parallel with an anti-parallel diode. It is envisaged that in other embodiments the insulated gate bipolar transistor may be replaced by a gate turn-off thyristor, a field effect transistor, a transistor, an injection enhancement gate transistor, an insulated gate commutated thyristor or an integrated gate commutated thyristor or another self-commutated or forced-commutated semiconductor device.

Each charge transfer element 32a,32b,32c,32d includes a resonant circuit in the form of an inductor 36 and a capacitor 38 connected in series. In other embodiments of the invention each charge transfer element 32a,32b,32c,32d may be connected in reverse so as to reverse the order of the series-connected inductor 36 and capacitor 38 to that shown in FIG. 1.

In other embodiments each charge transfer element 32a, 32b, 32c, 32d could include a plurality of parallel-connected such resonant circuits and/or that each resonant circuit may include one or more inductors connected in series with one or more capacitors.

In this way the structure of each charge transfer element 32a, 32b, 32c, 32d, may be varied to accommodate the voltage and current ratings of available components and the power requirements of the electrical networks to which it is intended to connect the converter 20.

The four primary switching elements, 34a, 34b, 34c, 34d, define a cascade arrangement of alternating odd-numbered primary switching elements, i.e. first, third and [n−1] primary switching elements 34a, 34c, 34 . . . , and even-numbered primary switching elements, i.e. second, fourth and [n] primary switching elements 34b, 34d, 34f . . . .

The first charge transfer element 32a is connected in parallel with the first and second primary switching elements 34a,34b, the second charge transfer element 32b is connected in parallel with the second and third primary switching elements 34b,34c, the third charge transfer element 32c is connected in parallel with the third and fourth primary switching elements 34c,34d, and the fourth charge transfer element 32d is connected in parallel with the fourth primary switching element 34d only and in series between the junction interconnecting the third and fourth switching elements 34c,34d and the second primary terminal 26.

The converter 20 shown further includes a DC link capacitor 40 connected in parallel with the primary charge transfer converter 22 to improve the efficiency of the voltage conversion process by minimising harmonic distortion in any first DC voltage $V_{DC1}$ connected to the first primary terminal 24. Other embodiments of the invention may omit the DC link capacitor 40.

As shown in FIG. 1, the auxiliary unit 28 defines a charge store which includes an auxiliary terminal 42, a first reservoir capacitor 44a, auxiliary switching elements 46 in the form of diodes, and a resonant circuit 45a. The auxiliary unit 28 also includes a filter 48 connected to the auxiliary terminal 42. The filter 48 includes an inductor 45b and a second reservoir capacitor 44b. In other embodiments the second reservoir capacitor 44b of the filter 48 may be omitted from the charge store.

The auxiliary terminal 42 may be connected to a second DC network 52 carrying a second DC voltage $V_{DC2}$, which is lower than the first DC voltage $V_{DC1}$.

The auxiliary also unit 28 includes a reference terminal 50 which defines a common reference between the first and second DC networks 50, 52. In the embodiment shown the reference terminal 50 is connected to ground, and so acts as a common reference against which each of the first and second DC voltages $V_{DC1}$, $V_{DC2}$ is determined. In other embodiments the reference terminal 50 may be defined a common link between the first and second networks 30, 52 which is not at zero volts, i.e. not a common ground connection.

The purpose of the auxiliary unit 28, i.e. the charge store, is to store charge in each of the reservoir capacitors 44a, 44b during operation of the converter 20 and to discharge the stored energy in the reservoir capacitors 44a, 44b when desired, so as to generate a desired output voltage at the auxiliary terminal 42.

In other embodiments the auxiliary unit 28 may consist of alternative arrangements of electronic components which provide the same above-mentioned functions as the charge store.

The resonant circuit, i.e. the series-connected inductor 46 and capacitor 38, of each charge transfer element 32a, 32b, 32c, 32d, are tuned to the same oscillating frequency.

In addition the switching frequency of each primary switching element 34a, 34b, 34c, 34d is set to be near or equal to the resonant frequency of the resonant circuits.

In use the converter 20 shown in FIG. 1 functions as described below:

When referring to charging and discharging of each charge transfer element 32a,32b,32c,32d it is to be understood that this means charging and discharging of the capacitor 38 forming part of the respective charge transfer element 32a,32b, 32c,32d.

Initially all of the primary switching elements 34a, 34b, 34c, 34d are turned off.

On energisation of the first DC network 30 a DC current flows from the first primary terminal 24 to the second primary terminal 26, and in particular through the first and third charge transfer elements 32a,32c; and through the second and fourth charge transfer elements 32b,32d via the anti-parallel diode in each of the first and third primary switching elements 34a, 34c.

Once charged the converter 20 remains in the this state until power transfer is required.

In the first stage of power transfer, each IGBT in the odd-numbered primary switching elements, i.e. the first and third primary switching elements 34a, 34c is switched to a closed state while each IGBT in even-numbered primary switching elements 34b, 34d remains in an open state.

Figure 3A:
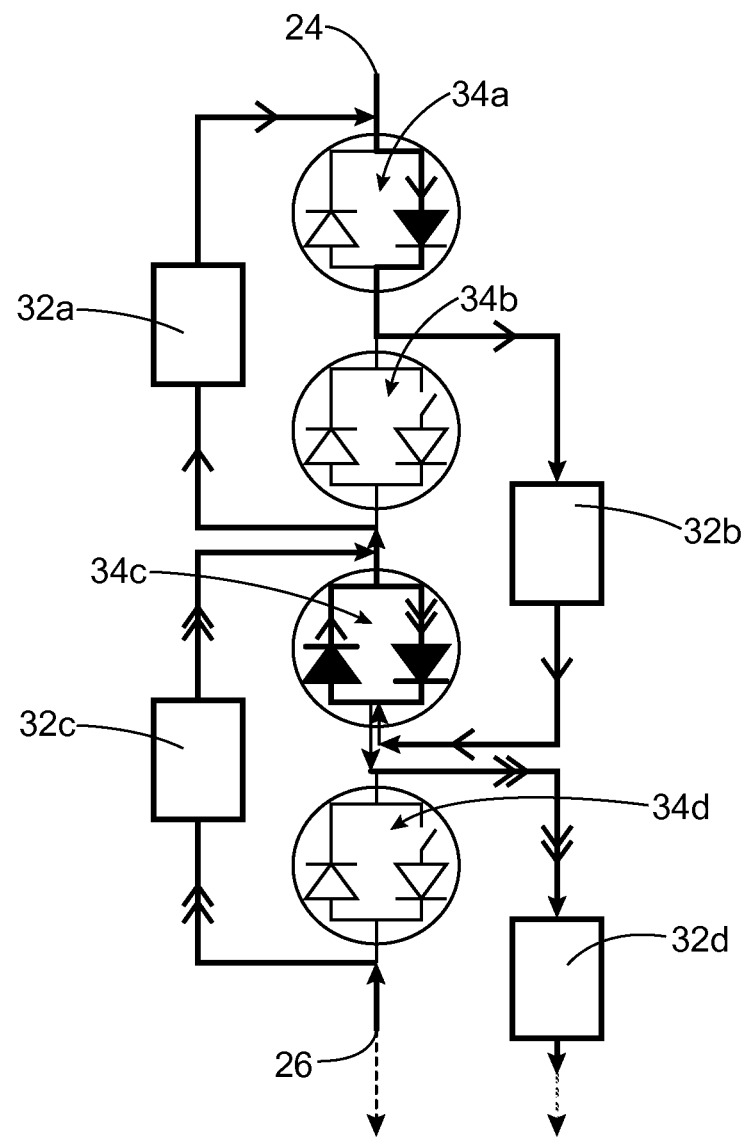
FIGS. 3a and 3b illustrate the operation of the converter shown in FIG. 1.

This results in the following (as shown in FIG. 3a):

(a) charging of the second charge transfer element 32b by current flowing from the first DC network 30 via the first primary terminal 24 and the closed IGBT of the first primary switching element 34a;

(b) a transfer of charge from the first charge transfer element 32a (i.e. discharge of the first charge transfer element 32a) to the second charge transfer element 32b by current flowing through the closed IGBT in the first primary switching element 34a;

(c) charging of the fourth charge transfer element 32d by current flowing directly from the second charge transfer element 32b;

(d) a transfer of charge from the third charge transfer element 32c (i.e. discharge of the third charge transfer element 32c) to the fourth charge transfer element 32d by current flowing through the closed IGBT in the third primary switching element 34c; and (e) a flow of current from the second charge transfer element 32b through the third primary switching element 34c via the anti-parallel diode thereof.

The flow of current through the anti-parallel diode of the third primary switching element 34c is opposed by the flow of current from the third charge transfer element 32c through the closed IGBT of the third primary switching element 34c.

As a result the third primary switching element 34c only has to transfer the net difference between the opposing currents. Therefore the majority of the current from the second charge transfer element 32b flows directly into the fourth charge transfer element 32d and only a much smaller, so-called "difference current" flows through the third primary switching element 34c.

In the second stage of power transfer, each IGBT in the odd-numbered primary switching elements 34a,34c is switched from a closed state to an open state and each IGBT in the even-numbered primary switching elements 34b, 34d is switched from an open state to a closed state.

Figure 3B:
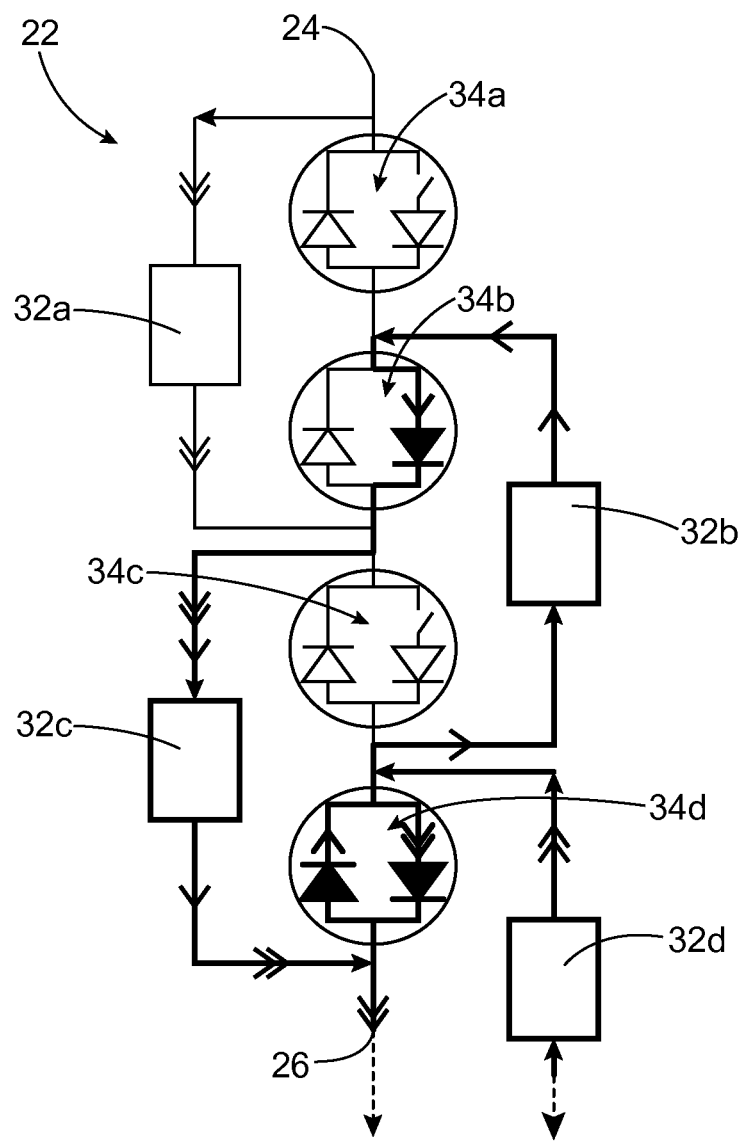

This results in the following (as shown in FIG. 3b):

(a) recharging of the first charge transfer element 32a by current flowing directly from the first DC network 30;

(b) a transfer of charge from the second charge transfer element 32b (i.e. discharge of the second current transfer element 32b) to the third charge transfer element 32c by current flowing through the closed IGBT in the second primary switching element 34b;

(c) further charging of the third charge transfer element 32c by current flowing directly from the first charge transfer element 32a;

(d) a transfer of charge from the fourth charge transfer element 32d (i.e. discharge of the fourth charge transfer element 32d) to the first and second reservoir capacitors 44a, 44b in the auxiliary unit 28 by current flowing through the closed IGBT in the fourth primary switching element 34d; and (e) a flow of current from the third charge transfer element 32c through the fourth primary switching element 34d via the anti-parallel diode thereof.

The flow of current through the anti-parallel diode of the fourth primary switching element 34d is opposed by the flow of current from the fourth charge transfer element 32d through the closed IGBT of the fourth primary switching element 34d.

As a result the fourth primary switching element 34d only has to transfer the net difference in current between the opposing currents. Therefore, the majority of the current flowing within the primary charge transfer converter 22 is transferred directly between the first and third charge transfer elements 32a, 32c, and only a much smaller difference current flows through each of the second and fourth primary switching elements 34b, 34d.

Accordingly, the odd and even-numbered primary switching elements 34a, 34c, 34b, 34d are operable to control the direction of current flow within the primary charge transfer converter 22 so that each charge transfer element 32a, 32b, 32c, 32d alternates between charging and discharging (i.e. the first and third charge transfer elements 32a, 32c discharging and the second and fourth charge transfer elements 32b, 32d charging during the first stage of power transfer; and the second and fourth charge transfer elements 32b, 32d discharging and the first and third charge transfer elements 32a, 32c charging during the second stage of power transfer).

In this manner the primary role of each switching element 34a, 34b, 34c, 34d is current control rather than current transmission.

Figure 2:
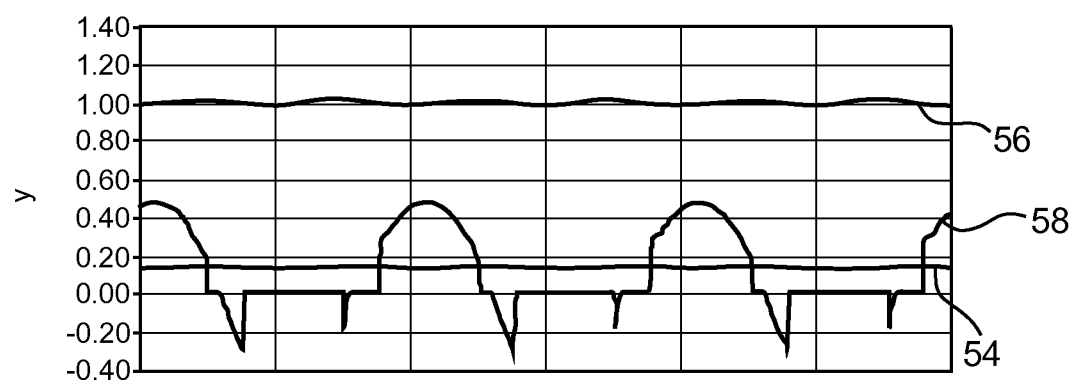
FIG. 2 shows the current characteristics of a primary switching element in the converter shown in FIG. 1.

For example, FIG. 2 shows the current flowing through a primary switching element 34 in the converter 20 when configured to transfer power from a 8 KV/125A first DC network 30 to a 1 KV/IKA second DC network 52.

The current illustrated is typical of the current flowing in any of the middle switching elements, i.e. the second and third switching elements 34b, 34c, but not the first and last switching elements, i.e. the first and fourth switching elements 34a, 34d.

In particular FIG. 2 shows a first input current 54, flowing at the first primary terminal 24 and a second output current 56 flowing at the auxiliary terminal 42.

As mentioned above, the resonant frequency of the resonant circuits is used as the switching frequency of each primary switching element 34a, 34b, 34c, 34d leads to the formation of an oscillating voltage waveform. The oscillating voltage waveform comprises a sine wave component, the magnitude of which is determined by the current flow, and a DC voltage component which is equivalent to the first DC voltage $V_{DC1}$ divided by the number of charge transfer elements 32a, 32b, 32c, 32d.

The difference current 58 flowing through each switching element 32b, 34c, follows a half cycle sinusoidal waveform. The generation of a half cycle sinusoidal waveform allows soft switching of the primary switching elements 34b, 34c at or near zero current and thereby reduces switching losses in the converter 20.

The operation of the odd- and even-numbered primary switching elements 34a, 34c/34b, 34d in the first and second stages of power transfer leads to the accumulation of charge in each charge transfer element 32a, 32b, 32c, 32d. This charge manifests itself as a DC voltage across the capacitor 38 of the respective charge transfer element 32a, 32b, 32c, 32d.

In particular, each of the third charge transfer element 32c, and further charge elements extending downwards in the cascade circuit, receives charging current from each of the two immediately proceeding charge transfer elements, e.g. the third charge transfer element 32c receives charging current from each of the first and second charge transfer elements 32a, 32b.

Consequently the charge accumulates downwards in the primary charge transfer converter 22.

The DC voltages across the charge transfer elements 34a, 34b, 34c, 34d offset the first DC voltage $V_{DC1}$ of the first DC network 30 which is present at the first primary terminal 24. As such, operation of the converter 20 leads to a voltage step-down between the first and second primary terminals 24, 26, thereby allowing the connection of a high voltage first DC network 30 to a low voltage second DC network 52.

The first and second stages of power transfer are repeated until the desired output voltage is achieved. At this stage, the stored energy in the first and second reservoir capacitors 44a, 44b of the charge storage circuit is discharged to generate the desired voltage at the auxiliary terminal 42 and thereby enable connection to the lower voltage second DC network 52.

Figure 4:
FIG. 4 shows the power transfer characteristics of the converter shown in FIG. 1.

For example, FIG. 4 shows the power transfer characteristics of a converter interconnected between an 8 kV first DC network and a 1 kV second DC network 52. The converter has a similar structure to the first converter 20 shown in FIG. 1 except that the primary charge transfer converter 22 includes eight primary switching elements 34 and eight charge transfer elements 32.

An output DC current 60 at the auxiliary terminal 42 was increased from 0.5 kA to 1 kA and back to 0.5 kA. The change in current at the auxiliary terminal 42 led to a corresponding change in the input DC current 62 at the first primary terminal 24 of the primary charge transfer converter 22.

As seen from the plots in FIG. 4, the converter exhibited excellent stability in the presence of a changing output current 60 at the auxiliary terminal 42. Additionally the difference 64 in power levels 66, 68 of the 8 kV and 1 kV DC networks is minimal, which indicates a highly efficient converter.

The primary switching elements 34a, 34b, 34c, 34d are controllable to provide a time delay between the switching of the semiconductor devices in an open state, i.e. off to a closed state, i.e. on.

In particular, increasing the length of time a given switching element 34a, 34b, 34c, 34d is off reduces the flow of charge (and hence the transfer of power), while decreasing the off time increases the flow of charge (and hence the transfer of power).

The inclusion of a time delay also helps to ensure that there is no direct connection between the voltages connected to the first and second primary terminals 24, 26, i.e. between the first and second DC networks 30, 52. This helps to prevent short-circuiting of the charge transfer elements 32a,32b,32c,32d and minimises the risk of the primary switching elements 34a,34,34c,34d carrying the much larger entire current load.

Figure 5:
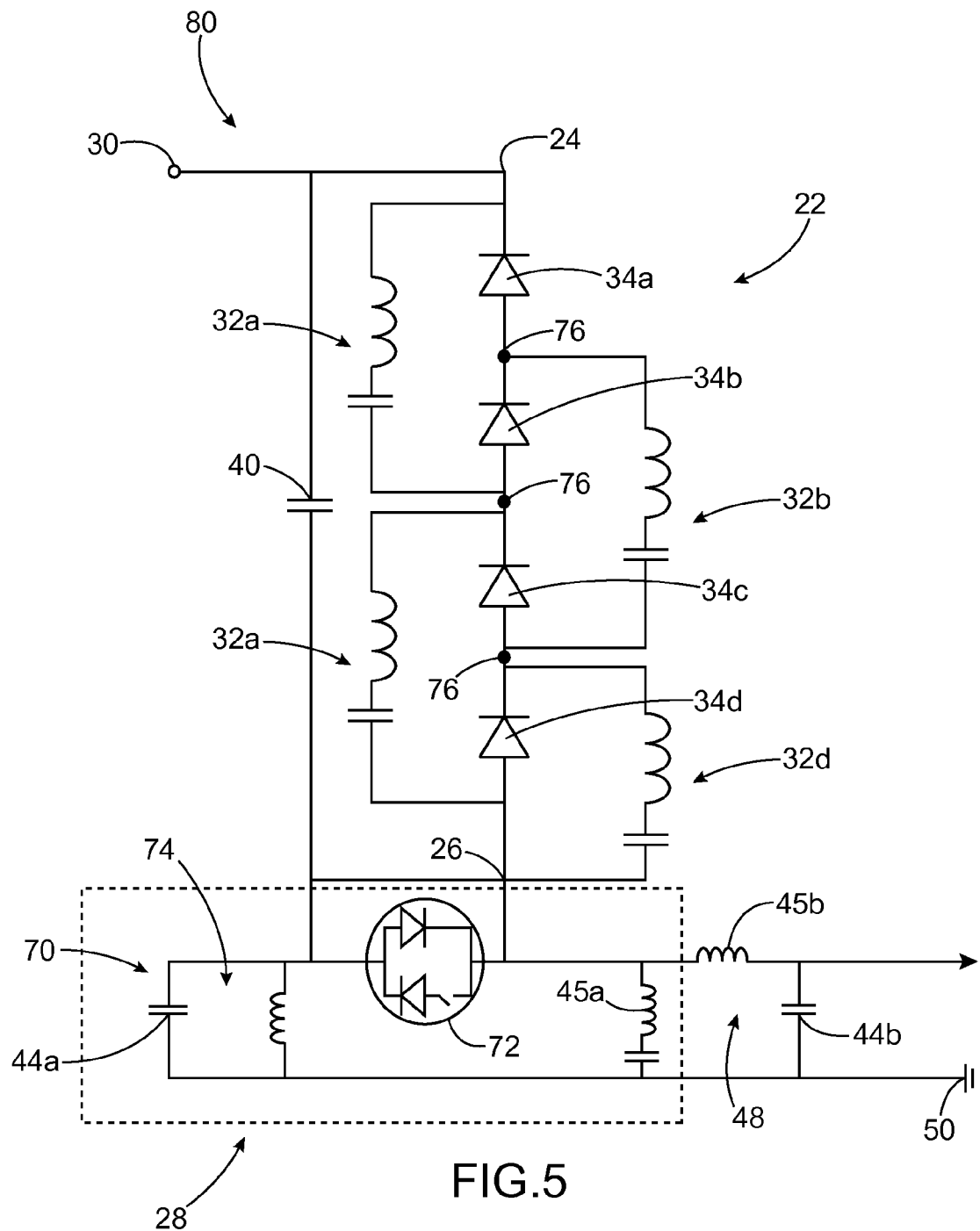
FIG. 5 shows a converter according to a second embodiment of the invention.

A converter 80 according to a second embodiment of the invention is shown in FIG. 5.

The second converter 80 shown in FIG. 5 is similar to the first converter 20 shown in FIG. 1 and like features have the same reference numerals. However, two ways in which the second converter 80 differs from the first converter 20 is that each primary switching element 34a, 34b, 34c, 34d is a single diode switch and the auxiliary unit 28 defines a charge generator in the form of an oscillator circuit 70.

In alternative arrangements of the second converter 80 (not shown) the single diode switch can be replaced by another switch arrangement such as, for example, an IGBT arranged in parallel with a diode but with the IGBT switched off.

The oscillator circuit 70 includes an auxiliary switch 72 and a passive circuit 74 tuned to the resonant frequency of the resonant circuits. The oscillator circuit 70 further includes a filter 48 connected to the auxiliary terminal 42 and a connection to ground 50.

In use, the oscillator circuit 70 is operable to generate charge in the charge transfer elements 32a, 32b, 32c, 32d by introducing an AC voltage waveform into the second primary terminal 26 of the primary charge transfer converter 22.

In other embodiments, the auxiliary unit 28 may consist of alternative arrangements of electronic components which provide the same above-mentioned functions as the charge generator.

The frequency of the AC voltage waveform is set to be near or equal to the resonant frequency of the resonant circuit of each charge transfer element 32a, 32b, 32c, 32d, and so the current flowing through the diode in each primary switching element 34a, 34b, 34c, 34d describes a half cycle sinusoidal waveform during converter operation. This allows soft switching of each diode at or near zero current so as to minimise switching losses in each diode when switching between forward- and reverse-bias states and vice versa.

During the positive half cycle of the AC voltage waveform, the second and fourth primary switching elements 34b, 34d are forward-biased, i.e. switched on, while the first and third primary switching elements 34a, 34c are reverse-biased, i.e. switched off.

Figure 6A:
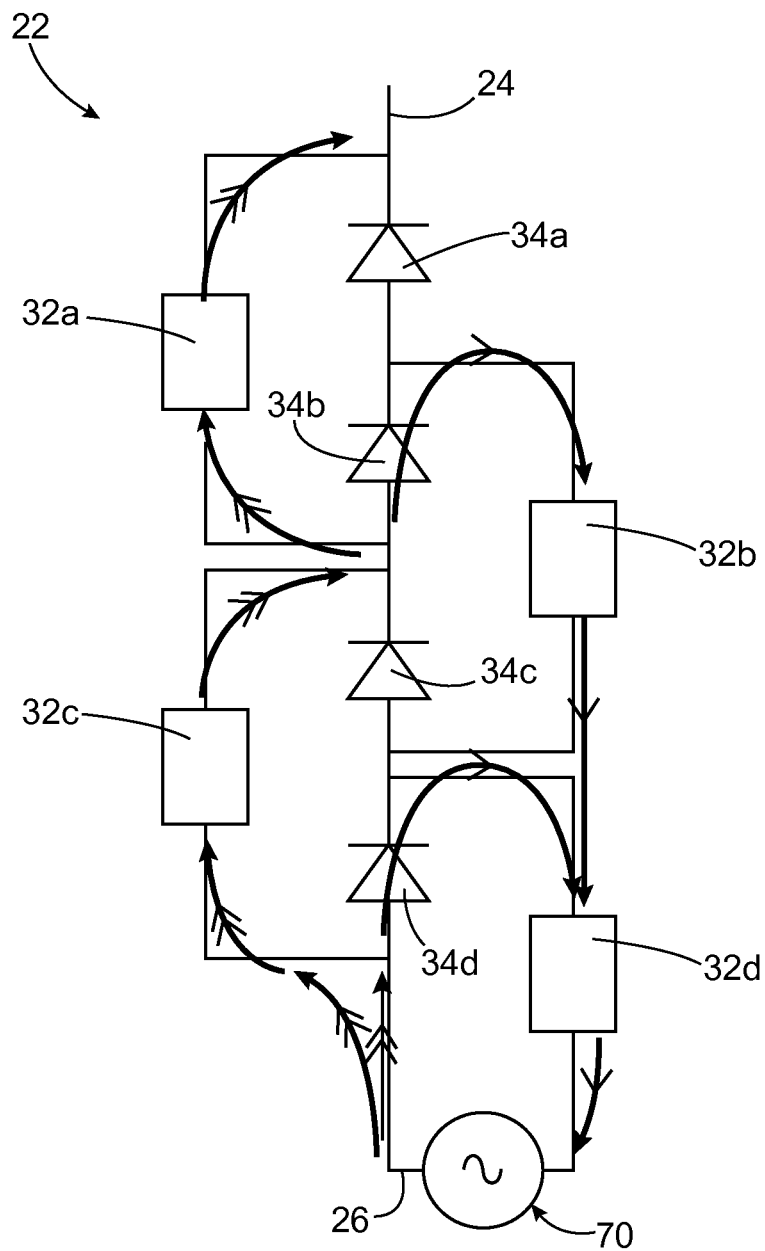
FIGS. 6a and 6b show the operation of the converter shown in FIG. 5.

This results in the following (as shown in FIG. 6a):

(a) charging of the fourth charge transfer element 32d by current flowing from the oscillator circuit 70 via the forward-biased fourth primary switching element 34d;

(b) a transfer of charge from the third charge transfer element 32c to the second charge transfer element 32b by current flowing through the forward-biased second primary switching element 34b; and (c) a discharge of the first charge transfer element 32a into the first network 30 by current flowing via the first primary terminal 24.

Accordingly the second and fourth charge transfer elements 32b, 32d are charged and the first and third charge transfer elements 32a, 32c are discharged.

During the negative half cycle of the AC voltage waveform, the first and third primary switching elements 34a, 34c are forward-biased while the second and fourth primary switching elements 34b, 34d are reverse-biased.

Figure 6B:
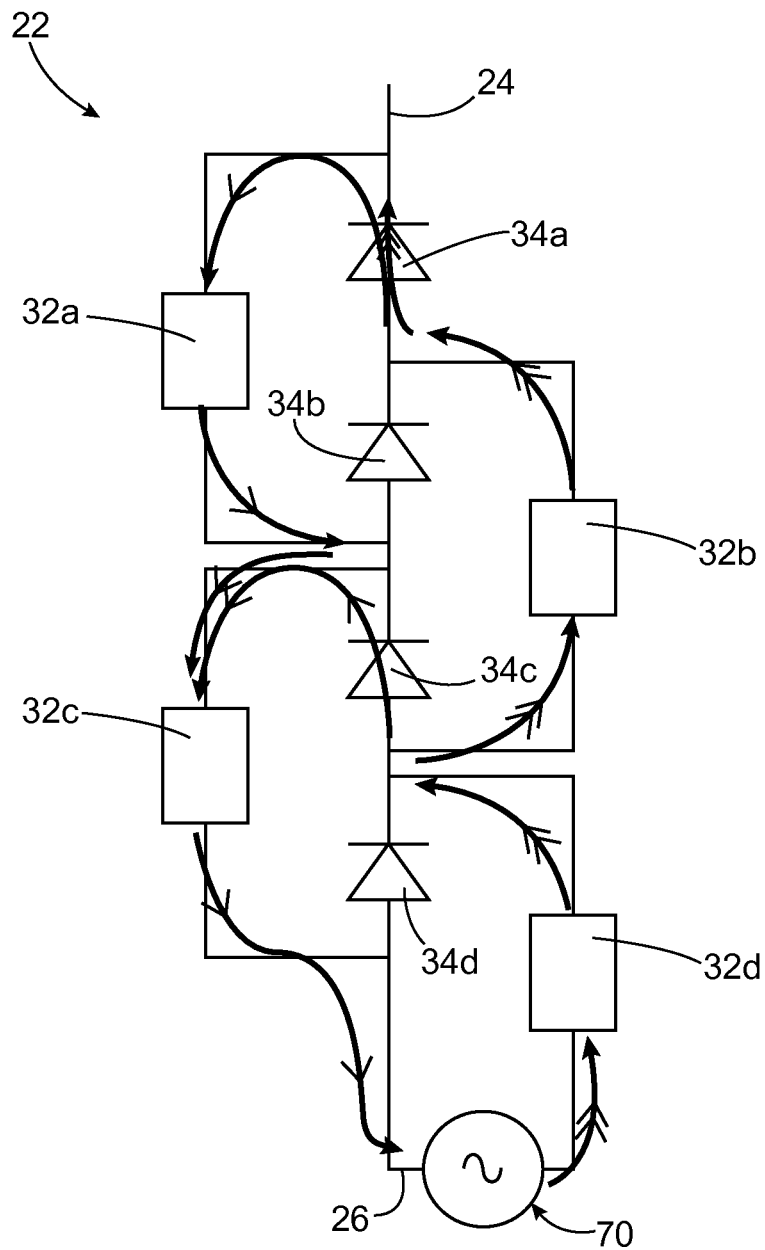

This results in the following (as shown in FIG. 6b):

(a) a transfer of charge from the fourth charge transfer element 32d to the third charge transfer element 32c by current flowing through the forward-biased third primary switching element 34c;

(b) charging of the third charge transfer element 32c by the above-mentioned current flowing from the fourth charge transfer element 32d;

(c) a transfer of charge from the second charge transfer element 32b to the first network 30 and the first charge transfer element 32a by current flowing through the forward-biased first primary switching element 34a; and (d) charging of the first transfer element 32a by the above-mentioned current flowing from the second charge transfer element 32b.

Accordingly the second and fourth charge transfer elements 32b, 32d are discharged while the first and third charge transfer elements 32a, 32c are charged.

The charging and discharging of each charge transfer element 32a, 32b, 32c, 32d in the above manner successively transfers charge from a higher-numbered charge transfer element, e.g. the fourth charge transfer element 32d, to the subsequent lower-numbered charge transfer element, e.g. the third charge transfer element 32c and so on.

The accumulation of charge in a given charge transfer element 32a, 32b, 32c, 32d results in the formation of a DC voltage across the capacitor 38 of the respective charge transfer element 32a, 32b, 32c, 32d. This establishes a DC voltage at the first primary terminal 24 which is equal to the sum of these individual DC voltages. As such, the second converter 80 is capable of performing a voltage step-up operation so as to connect a low voltage second DC network 52 to a high voltage first DC network 30.

Figure 7:
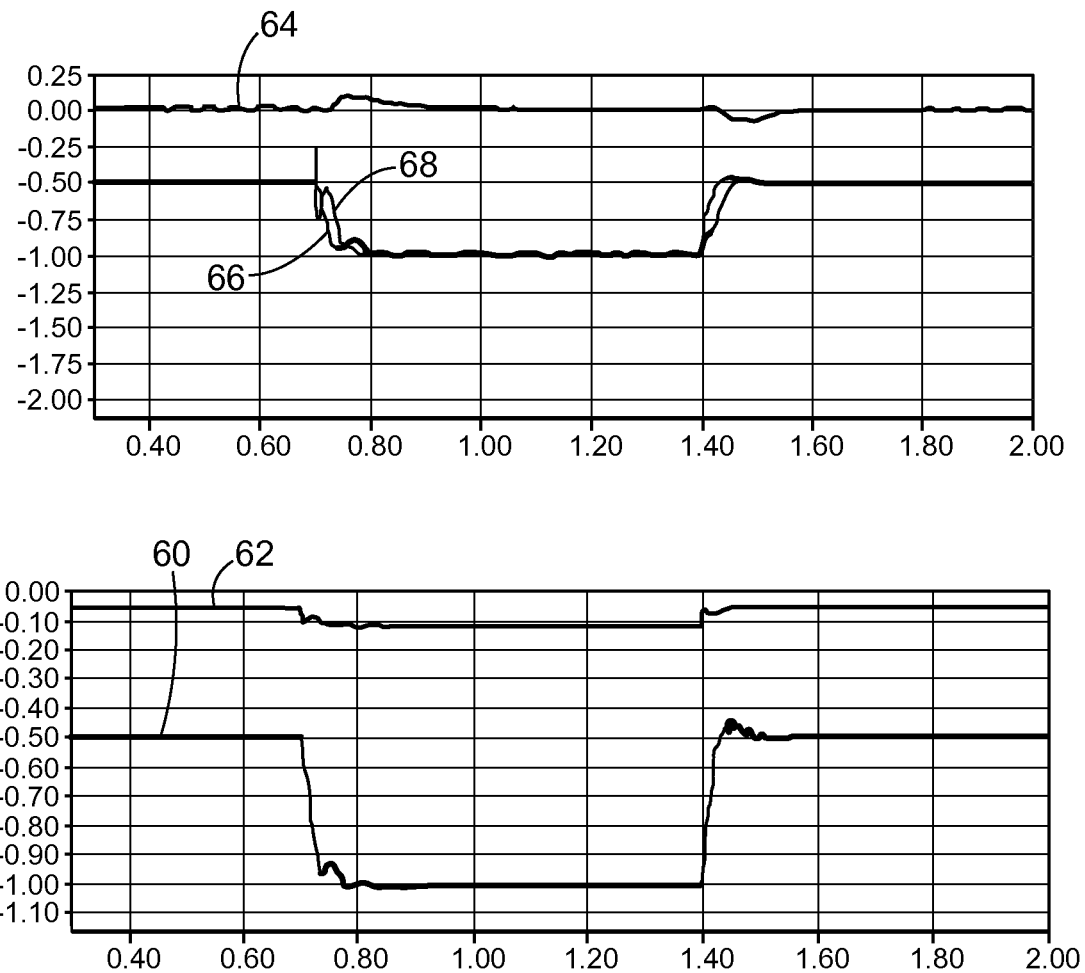
FIG. 7 shows the power transfer characteristics of the converter shown in FIG. 5.

FIG. 7 shows the power transfer characteristics of a converter interconnected between an 8 kV between first DC network and a 1 kV second DC network 52. This converter has a similar structure to the second converter 80 shown in FIG. 5 except that the primary charge transfer converter includes eight diodes, i.e. eight primary switching elements 32, and eight charge transfer elements.

An input DC current 60 flowing into the auxiliary terminal 42 was increased in magnitude from 0.5 kA to 1 kA and back to 0.5 kA. The change in current at the auxiliary terminal 42 led to a corresponding change in output DC current 62 at the first primary terminal 24 of the primary charge transfer converter 22.

As seen from the plots in FIG. 7, the converter exhibited excellent stability in the presence of a changing input current 60 at the auxiliary terminal 42. Additionally the difference 64 in power levels 66, 68 at the 8 kV and 1 kV DC networks is minimal, which indicates a highly efficient converter.

During the operation of the first and second converters 20; 80 shown in FIGS. 1 and 5, some of the primary switching elements 34a, 34b, 34c, 34d i.e. all but the first and last primary switching elements 34a, 34d, are only required to support a portion of the current flowing through the primary charge transfer converter 22. This is because in each converter 20; 80 a significant portion of the current flows directly between the charge transfer elements 32a, 32b, 32c, 32d. Consequently it is possible to reduce the required current rating of all but the first and last the primary switching elements and thereby decrease hardware size, weight and costs.

The capacitance values of each charge transfer element 32a, 32b, 32c, 32d is chosen according to the power ratings of the individual components of the primary charge transfer converter 22 and the requirements of the associated power application.

The capacitance values of the charge transfer elements 32a, 32b, 32c, 32d may be equal. Alternatively the capacitance values of the charge transfer elements 32a, 32b, 32c, 32d may be different so that the voltage across each charge transfer element is the same during operation of the converter 20; 80.

The capacitance value of each charge transfer element 32a, 32b, 32c, 32d may be set either by using a specific capacitor with the required capacitance value or using a plurality of standard capacitors in a specific configuration to match the required capacitance value.

The provision of a resonant circuit in each charge transfer element 32a, 32b, 32c, 32d enables the commutation of the primary switching elements 32a, 32b, 32c, 32d at near zero current so as to reduce switching losses during the transfer of charge between different charge transfer elements 32a, 32b, 32c, 32d. This also helps to ensure minimal overall power loss during power conversion between different electrical networks, and hence improved conversion efficiency.

The use of a cascade circuit in the converters 20; 80 permits the interconnection of electrical networks having different voltage levels and thereby removes the need for large and bulky transformers to step up or step down the operating voltage. This in turn leads to a reduction in converter size, weight and cost, which is beneficial for locations having restrictions on converter size and weight such as, e.g. offshore power stations.

The modular nature of cascade circuit allows converter 20; 80 to be easily modified to support different voltage levels. For example, extension of the cascade circuit by increasing the number of primary switching elements 34 and charge transfer elements 32 provides for a larger difference in voltage levels between the first and second DC networks 30, 52.

In each of the first and second converters 20; 80 shown each junction between two adjacent primary switching elements 34a,34b,34c,34d defines a secondary terminal 76.

The provision of one or more secondary terminals 76 permits the converter 20; 80 to be simultaneously connected to multiple power networks having different DC voltage levels or respective phases of a multi phase AC network.

The converter 20; 80 is, therefore, connectable to a wide range of different networks without having to modify the design and structure of the converter 20; 80. Such flexibility allows the manufacture of a single converter 20; 80, which is applicable to a wide range of power applications.

The converter 20; 80 structure can be easily incorporated into various converter assemblies to fit specific requirements of an associated power application, as described herein below.

Figure 8:
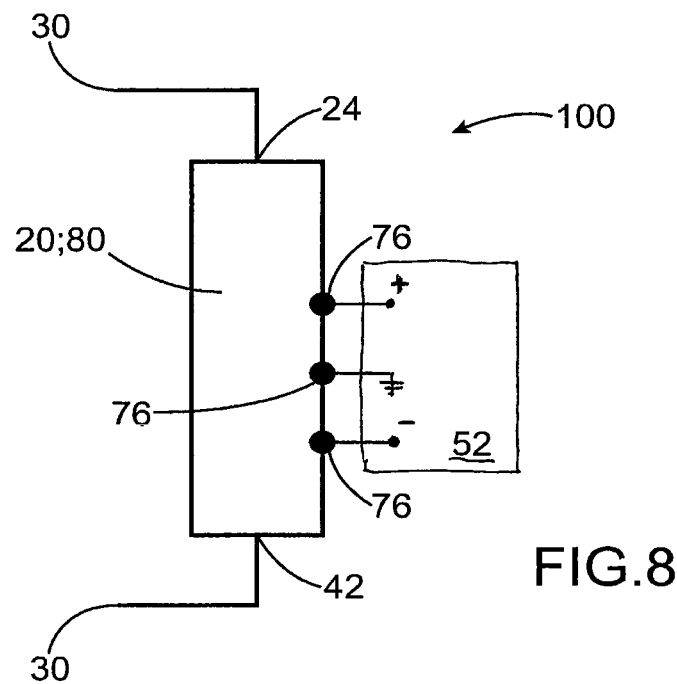
FIGS. 8 to 12 show respective converter assemblies according to further embodiments of the invention.

FIG. 8 shows a first converter assembly 100 according to a third embodiment of the invention.

The first converter assembly includes a converter 20; 80 in which the first primary terminal 24 is connected to a positive terminal of a first DC network 30 while the auxiliary terminal 42 is connected to a negative terminal of the first DC network 30.

A plurality of secondary terminals 76 are connected to positive, negative and ground terminals of a second DC network 52.

Such a converter assembly 100 permits power conversion between different bipole DC networks 30,52.

Figure 9:
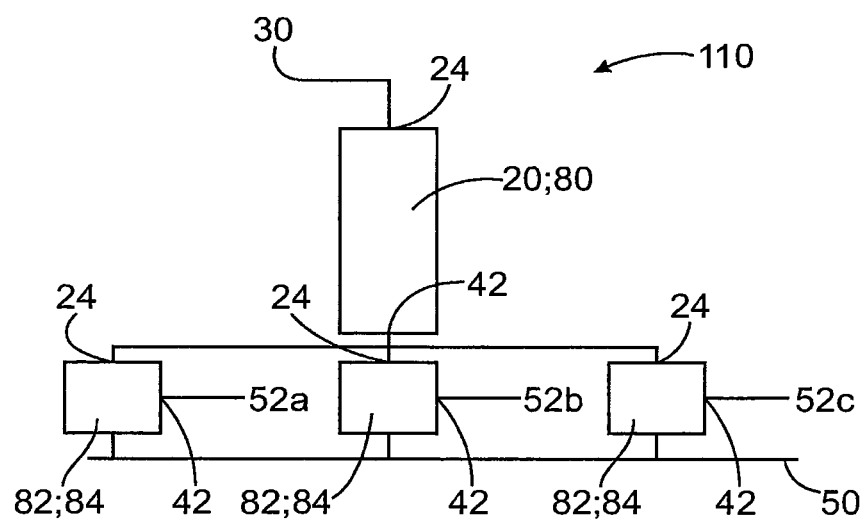

FIG. 9 shows a second converter assembly 110 according to a fourth embodiment of the invention.

The second converter assembly 110 includes a converter 20; 80 and a plurality of secondary charge transfer converters 82 and a plurality of secondary auxiliary units 84.

The first primary terminal 24 of each of the plurality of secondary charge transfer converters 82 is connected to the auxiliary terminal 42 of the voltage converter 20; 80. Each of the plurality of secondary auxiliary units 84 is connected to the second primary terminal 26 of the respective secondary charge transfer converter 82.

The first primary terminal 24 of the voltage converter 20; 80 is connected to a first DC network 30 while the auxiliary terminal 42 of each secondary auxiliary unit 84 is connected to a different second DC network 52a, 52b, 52c.

The above configuration results in a parallel arrangement of secondary charge transfer converters 82.

The provision of a plurality of parallel-connected secondary charge transfer converters 82 assembly 110 allows the output voltage at each of the auxiliary and/or secondary terminals to undergo pulse width modulation without significantly influencing the output voltage at the other auxiliary and/or secondary terminals and thereby permits independent control of the different output voltages. This leads to a simplification of the associated converter control scheme In the second converter assembly 110 the secondary charge transfer converters 82 have the same structure and mode of operation as the primary charge transfer converter 22 in the converters 20; 80 described above. Common features of the primary and secondary charge transfer converter 22; 82 share the same reference numerals.

In other embodiments, the primary charge transfer converter 22 may have a different number of primary switching elements and charge transfer elements to the or each secondary charge transfer converter 82.

Similarly, the secondary auxiliary units 84 have the same structure and mode of operation as the primary auxiliary unit 28 in the first and second converters 20; 80 described above. These two similar components also share the same reference numerals for common features.

The output voltage at the auxiliary terminal 82 of the or each auxiliary unit and/or the or each secondary terminal 72 of the second converter assembly 110 may undergo pulse-width modulation so as to modify its voltage characteristics to match the requirements of the associated power application.

The modulation can be such as to maintain a constant DC output voltage, or to impose a time-varying magnitude to the voltage in order to produce an AC output voltage.

Figure 10:
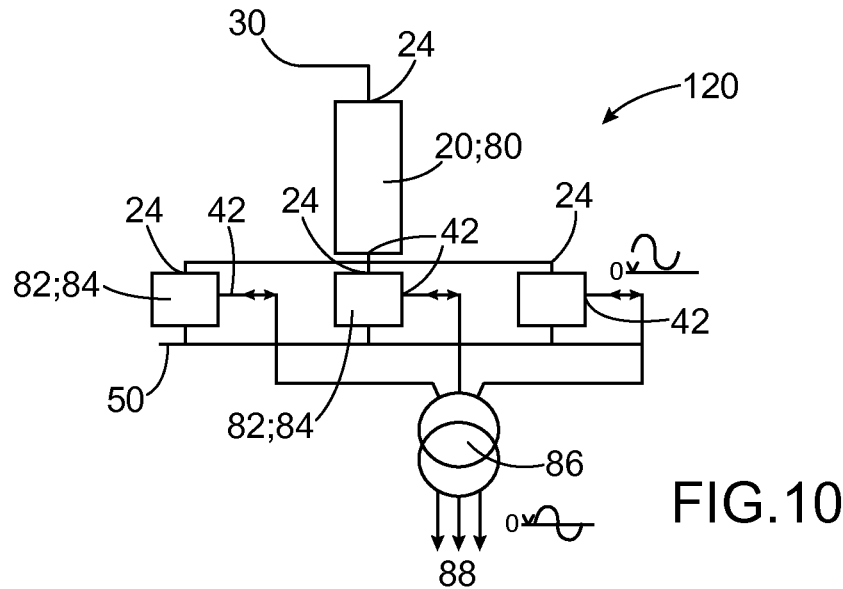

FIG. 10 shows a third converter assembly 120 according to a fifth embodiment of the invention. The third converter assembly 120 is similar to the second converter assembly 110 shown in FIG. 9 but further includes a transformer 86 connected between the auxiliary terminal 42 of each secondary auxiliary unit 84 and a multiphase AC network 88. In particular, the auxiliary terminal 42 of each secondary auxiliary unit 84 is operably connected to a respective phase of the multiphase AC network 88.

The third converter assembly 120 provides power conversion between a first DC network 30 and a second multiphase AC network 88.

Figure 11:
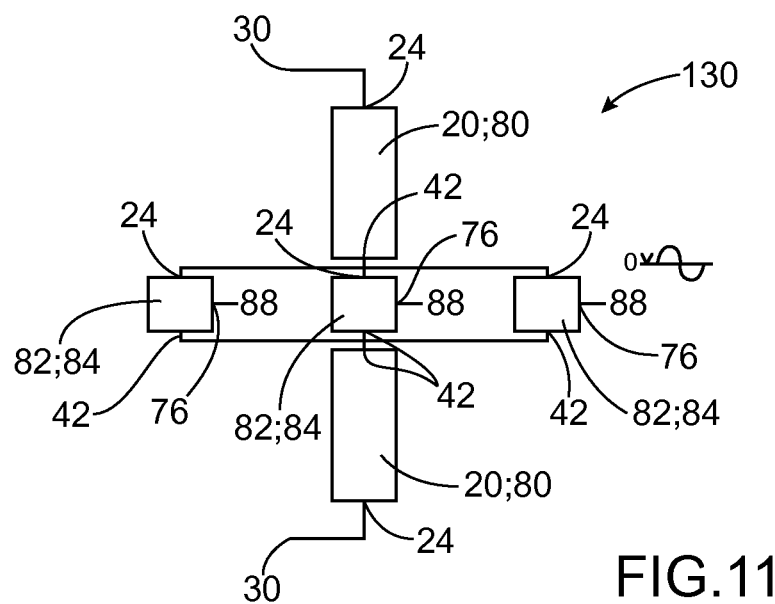

FIG. 11 shows a fourth converter assembly 130 according to a sixth embodiment of the invention.

The fourth converter assembly 130 includes two converters 20; 80 and a plurality of secondary charge transfer converters 82 and secondary auxiliary units 84.

Each of the plurality of secondary auxiliary units 84 is connected to the second primary terminal 26 of a corresponding secondary charge transfer converter 82.

The first primary terminal 24 of each secondary charge transfer converter 82 is connected to the auxiliary terminal 42 of a first converter 20; 80 while the auxiliary terminal 42 of each secondary auxiliary unit 84 is connected to the auxiliary terminal 42 of a second converter 20; 80.

Each secondary charge transfer converter 82 also includes a secondary terminal 76.

The first primary terminal 24 one converter 20; 80 is connected to a positive terminal of a first DC network 30 while the first primary terminal 24 of the second converter 20; 80 is connected to a negative terminal of the first DC network 30. The secondary terminal 76 of each secondary charge transfer converter 82 is connected to a respective phase of a multiphase AC network 88. The foregoing arrangement permits power conversion between a bipole DC network 30 and a multiphase AC network 82.

Figure 12:
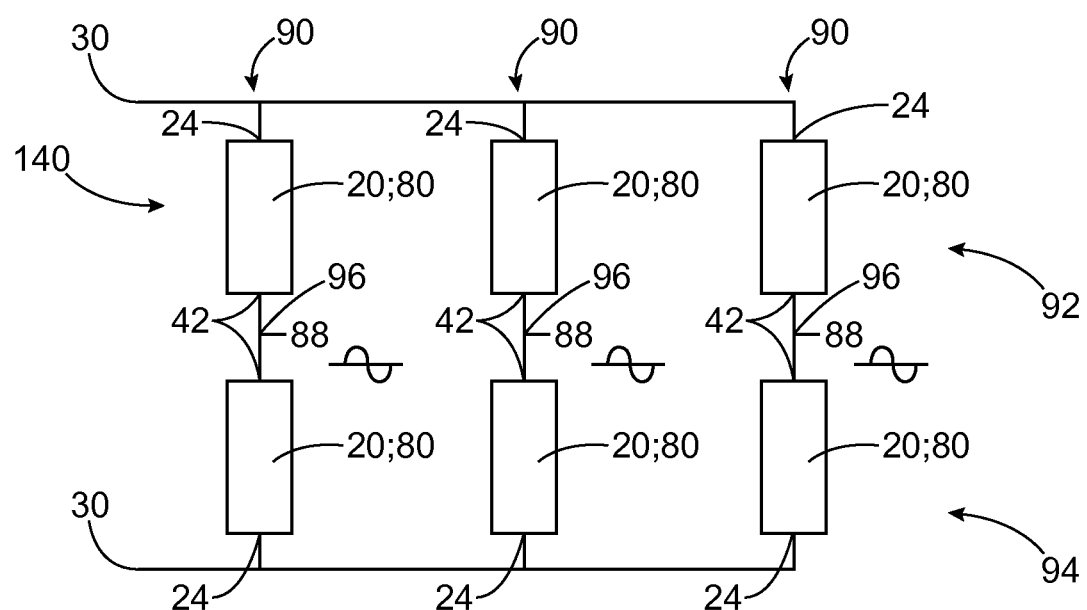

FIG. 12 shows a fifth converter assembly 140 according to a seventh embodiment of the invention.

The fifth converter assembly 140 includes three converter limbs 90.

Each converter limb 90 defines first and second limb portions 92,94, and each limb portion 92,94 includes a converter 20; 80.

The first primary terminal 24 of each converter 20; 80 in the first limb portion is connected to a positive terminal of a bipole first DC network 30. The first primary terminal 24 of each converter 20; 80 in the second limb portion 94 is connected to a negative terminal of the first DC network 30.

In each converter limb 90, the auxiliary terminals 42 of each converter 20; 80 are connected in series. A junction between the series-connected auxiliary terminals 42 of each converter limb 90 defines a phase terminal 96 which is connected to a respective phase of a multiphase AC network 88.

The auxiliary unit 28 of the converter 20; 80 in each limb portion 92,94 is operable to switch the respective limb portion 92,94 in and out of circuit so as to generate a voltage waveform at the phase terminal 96 of the respective converter limb 90.

The operation of the fifth converter assembly 140 in this manner facilitates power conversion between the bipole DC network 30 and the multiphase AC network 88.

In such a converter assembly 140 each converter limb 90 operates independently of the other converter limbs 90. The operation of each limb 90 therefore only directly affects the phase connected to the respective phase terminal 96 and has minimal influence on the phase respective connected to the phase terminals 96 of the other converter limbs 90.

In other embodiments, it is envisaged that the converter assembly may include a single converter limb or a plurality of converter limbs 90 where each phase terminal 96 of each converter limb 90 is connected in use to a respective phase of a multiphase AC network.

The invention claimed is:

1. A converter for use in high voltage direct and alternating current power transmission, the converter comprising a primary charge transfer converter, including first and second primary terminals for connection to one or more electrical networks, a plurality of charge transfer elements, and a plurality of primary switching elements connected in a single series connected circuit between the first and second primary terminals, each charge transfer element including at least one resonant circuit having a resonant frequency, the plurality of charge transfer elements and the plurality of primary switching elements being connected in a cascade circuit wherein the plurality of charge transfer elements comprise a first set of charge transfer elements connected in series between the first and second primary terminals and a second set of charge transfer elements connected in series, each charge transfer element being connected in parallel with a different set of at least one primary switching element, a primary switching element of each different set of at least one primary switching element being shared in parallel with a charge transfer element of said first set and a charge transfer element of said second set, and wherein the primary switching elements are operable at a frequency equal or approximately equal to the resonant frequency of the resonant circuit to selectively cause charging and discharging of each resonant circuit to transfer charge between the charge transfer elements and thereby create a voltage difference between the first and second primary terminals.

2. The converter according to claim 1, wherein the junction between adjacent primary switching elements defines a secondary terminal.

3. The converter according to claim 1, wherein at least one resonant circuit of each charge transfer element includes at least one inductor connected in series with at least one capacitor.

4. The converter according to claim 1, wherein at least one charge transfer element includes a plurality of parallel-connected resonant circuits.

5. The converter according to claim 1, wherein each primary switching element is or includes a semiconductor device.

6. The converter according to claim 5, wherein each primary switching element further includes an anti-parallel diode connected in parallel with the semiconductor device.

7. The converter according to claim 5, wherein the semiconductor device is an insulated gate bipolar transistor, a gate turn-off thyristor, a field effect transistor, a transistor, an injection enhancement gate transistor, an insulated gate commutated thyristor or an integrated gate commutated thyristor.

8. The converter according to claim 6, wherein the plurality of primary switching elements define a cascade arrangement of alternating odd and even primary switching elements, the primary switching elements being controllable to selectively put each of the odd primary switching elements in a first open/closed state and each of the even primary switching elements in a second open/closed state opposite the first open/closed state.

9. The converter according to claim 8, wherein the plurality of primary switching elements of are controllable to alternate between a closed state and an open state.

10. The converter according to claim 9, wherein each of the primary switching elements is controllable to delay switching between the open state and the closed state.

11. The converter according to claim 10, wherein each of the primary switching elements is controllable to vary the length of the delay in switching between open and closed states.

12. The converter according to claim 1, wherein the resonant circuit of each charge transfer element is tuned to the same resonant frequency.

13. The converter according to claim 1, further including at least one DC link capacitor connected in parallel with the primary charge transfer converter.

14. The converter according to claim 1, further including a primary auxiliary unit connected to the second primary terminal thereof, the primary auxiliary unit defining either a charge store or a charge generator including an auxiliary terminal for connection to an electrical network.

15. The converter according to claim 14, wherein the primary auxiliary unit defines a charge store including at least one reservoir capacitor (44a) to store said charge.

16. The converter according to claim 14, wherein the primary auxiliary unit defines a charge generator including an oscillator circuit to introduce an AC voltage component into the charge transfer elements of the primary charge transfer converter.

17. The converter according to claim 15, wherein the oscillator circuit operates at a frequency that approximates the resonant frequency of the charge transfer elements.

18. A converter assembly comprising the converter according to claim 14, wherein the first primary terminal is connected in use to a positive terminal of a first DC network, wherein the auxiliary terminal of the auxiliary unit is connected in use to a negative terminal of the first DC network, and wherein each junction between adjacent primary switching elements defines a secondary terminal which is connected in use to one of a positive terminal, a negative terminal and a ground terminal of a second DC network.

19. A converter assembly comprising the converter according to claim 14, and a plurality of parallel-connected secondary charge transfer converters each having a first and a second secondary terminal, wherein the first secondary terminal of each secondary charge transfer converter is connected to the auxiliary terminal of the converter and wherein a respective secondary auxiliary unit is connected to the second secondary terminal of each secondary charge transfer.

20. The converter assembly according to claim 19, wherein each secondary auxiliary unit comprises an auxiliary terminal and further including a transformer connected between the auxiliary terminal of each secondary auxiliary unit and a respective phase of a multiphase AC network.

21. The converter assembly according to claim 19, further including a second converter according to claim 14, the auxiliary terminal of the second converter being connected to the auxiliary terminal of each secondary auxiliary unit the first primary terminal of each converter being connected in use to respective positive and negative terminals of a first DC network, and each secondary charge transfer converter including a secondary terminal for connection in use to a respective phase of a multiphase AC network.

22. A converter assembly comprising a plurality of converters according to claim 14, and further including at least one converter limb having first and second limb portions, each limb portion including a said converter, the auxiliary terminal of the auxiliary unit in the converter in the first limb portion being connected in series with the auxiliary terminal of the auxiliary unit in the converter in the second limb portion to connect the converters in a given convert limb with one another end to end the first primary terminal of the converter in the first limb portion being connected in use to a positive terminal of a first DC network, the first primary terminal of the converter in the second limb portion being connected in use to a negative terminal of the first DC network, and the series connection between the auxiliary terminals defining a phase terminal connected in use to an AC network, the auxiliary unit of each limb portion being operable to switch the respective limb portion in and out of circuit so as to generate a voltage waveform at the phase terminal of the respective converter limb.

23. The converter assembly according to claim 22, defining a plurality of converter limbs, each converter limb including a phase terminal for connection to a respective phase of a multiphase AC network.

24. The converter assembly according to claim 19, wherein each auxiliary unit includes a reference terminal which is connected in use to a lower voltage potential than the corresponding auxiliary terminal.

* * * * *